United States Patent [19]
Obara et al.

[11] Patent Number: 6,057,936
[45] Date of Patent: *May 2, 2000

[54] IMAGE FORMING APPARATUS HAVING INTERNAL SPACE FOR SHEET EJECTION AND RETENTION

[75] Inventors: Hiroshi Obara, Yokohama; Masahiro Yonekawa, Machida, both of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/070,720

[22] Filed: May 1, 1998

[30] Foreign Application Priority Data

May 1, 1997 [JP] Japan ..................................... 9-113757

[51] Int. Cl.[7] .............................. H04N 1/21; G03G 15/00
[52] U.S. Cl. .......................... 358/296; 358/474; 399/405
[58] Field of Search ..................................... 399/362, 405, 399/366; 346/107.6; 358/498, 474, 296

[56] References Cited

U.S. PATENT DOCUMENTS

| | | | |
|---|---|---|---|
| 4,508,444 | 4/1985 | May et al. ............................ | 399/362 X |
| 5,387,980 | 2/1995 | Baitz et al. ........................... | 358/498 X |
| 5,519,512 | 5/1996 | Bandai et al. .......................... | 358/474 |
| 5,579,129 | 11/1996 | Iwata et al. .............................. | 358/474 |
| 5,587,812 | 12/1996 | Kasuya .................................... | 358/498 |
| 5,729,359 | 3/1998 | Nakazawa et al. ..................... | 358/498 |
| 5,790,932 | 8/1998 | Komaki et al. ......................... | 399/366 |
| 5,844,687 | 12/1998 | Nagane et al. .......................... | 358/296 |
| 5,920,758 | 7/1999 | Ohtsuki .................................. | 399/405 |

FOREIGN PATENT DOCUMENTS 8-339103  12/1996  Japan .

*Primary Examiner*—Susan S. Y. Lee
*Attorney, Agent, or Firm*—Oblon, Spivak, McClelland, Maier & Neustadt, P.C.

[57] ABSTRACT

An image forming apparatus includes an open interior space that retains ejected printed sheets. The apparatus includes a scanner that operates in a book-scanning mode of operation and a printer that includes a sheet ejection side wall in which an opening is formed for ejecting a printed sheet there through and a pair of support walls for supporting the scanner thereon. Each of the pair of support walls is orthogonal to the sheet ejection side wall and shorter in length than a length of the scanner in a longitudinal direction. In the image forming apparatus, the scanner is mounted on the sheet ejection side wall and the pair of support walls in a way such that a front part of the scanner projects in a horizontal direction from front edge sides of the sheet ejection side wall and the pair of support walls so that an interior space for handling the printed sheet is formed under a bottom part of the scanner that projects from the front edge sides of the sheet ejection side wall and the pair of support walls.

23 Claims, 3 Drawing Sheets

IMAGE FORMING APPARATUS HAVING INTERNAL SPACE FOR SHEET EJECTION AND RETENTION

BACKGROUND OF THE INVENTION

1. Field of the Invention

This invention relates to an image forming apparatus, and particularly to an image forming apparatus having an accessible internal space for accommodating printed sheets output the apparatus.

2. Discussion of the Background

Copying machines and facsimile machines are examples of typical image forming apparatuses that include a scanner for reading an image from an original sheet and a printer for printing data on a recording sheet. The copying machines generally have a flat scanner able to copy pages of bound documents, such as books. Both the copying machines and facsimile machines are able to accommodate loose-leaf sheets. Recently, a so-called multi-function peripheral (MFP) device has been introduced that is capable of performing all of the functions of, for example, facsimile, copying, and printing machines. MFP devices with a flat scanner are less common.

Generally, there are two paper ejection methods performed after completion of the printing operation in the above-mentioned typical image forming apparatus. One method ejects the printed sheets in a horizontal direction to a region for containing ejected sheets. This method is referred to as a "straight sheet ejection method." The other method transfers the sheets upwards and ejects the sheets face-down, and is referred to as a "face down ejection method."

A printer portion of the image forming apparatus can be miniaturized by applying the face-down ejection method. However, when the apparatus includes a flat scanner, the flat scanner limits the miniaturization potential of the apparatus due to a size of the scanner's platen, or contact glass. Thus the flat scanner has a relatively large footprint.

When the image forming apparatus has a structure in which a printed sheet is ejected to an area outside of the apparatus' footprint, an extra area is disadvantageously needed to accommodate printed sheets external to the space occupied by the apparatus.

On the other hand, as presently observed by the inventors, when the image forming apparatus includes a flat scanner situated on a printer having a relatively small extension surface (i.e., smaller footprint), the above-mentioned extra area can be eliminated. Specifically, when a scanner capable of scanning a bound document (i.e., a book-mode scanner) is mounted on a printer in such a way that the front of the scanner hangs over the front of the printer, a space under where the scanner overhangs and extends beyond the front of the printer is vacant and can therefore be used as a space for sheet ejection and retention.

As identified by the present inventors, when the scanner is a book-mode scanner that requires a relatively large horizontal flat surface for accommodating original documents, the book-mode scanner may have a larger surface area than that of the printer. Furthermore, the scanner's weight is distributed and therefore if only partially supported by a smaller printer, the apparatus may be top heavy and unstable, particularly when the image forming apparatus is used in an office environment, where different objects may be placed on the scanning apparatus. Furthermore, the inherent weight of the scanner may cause warpage of the scanner's platen, because not all edge surfaces of the scanner may be supported by the smaller printer. Consequently, the present inventors have identified that if the book-scanner and smaller printer are combined so as to provide an internal, accessible space for capturing ejected sheets, then additional counter measures are in order to provide appropriate support for the scanner, and provide for a mechanically stable apparatus.

SUMMARY OF THE INVENTION

In light of the limitations of conventional devices, an object of the present invention is to overcome the above-identified, as well as other, limitations of conventional apparatuses by providing an accessible, internal space for accommodating printed sheets output by the printer, without enlarging an overall footprint of the apparatus, and providing an operator with convenient access to the printed sheets.

A novel image forming apparatus according to the present invention includes a scanner capable of operating in a book-scanning mode of operation and a printer that includes a sheet ejection side wall having an opening for ejecting a printed sheet and a pair of support walls for supporting the scanner thereon. Each of the pair of support walls is orthogonal to an end of the sheet ejection side wall and shorter in length than a length of the scanner in a longitudinal direction. In the image forming apparatus, the scanner is mounted on the sheet ejection side wall and on the pair of support walls in a way such that a front side part of the scanner projects in a horizontal direction from, and extends beyond, front edge sides of the sheet ejection side wall and the pair of support walls so that an internal space for handling the printed sheet is formed under the projected part of the scanner and in front of the sheet ejection side wall. This space is open on at least one side so that an operator may easily view, and retrieve the printed sheets from the internal space.

Other features and advantages of the present invention will become readily apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
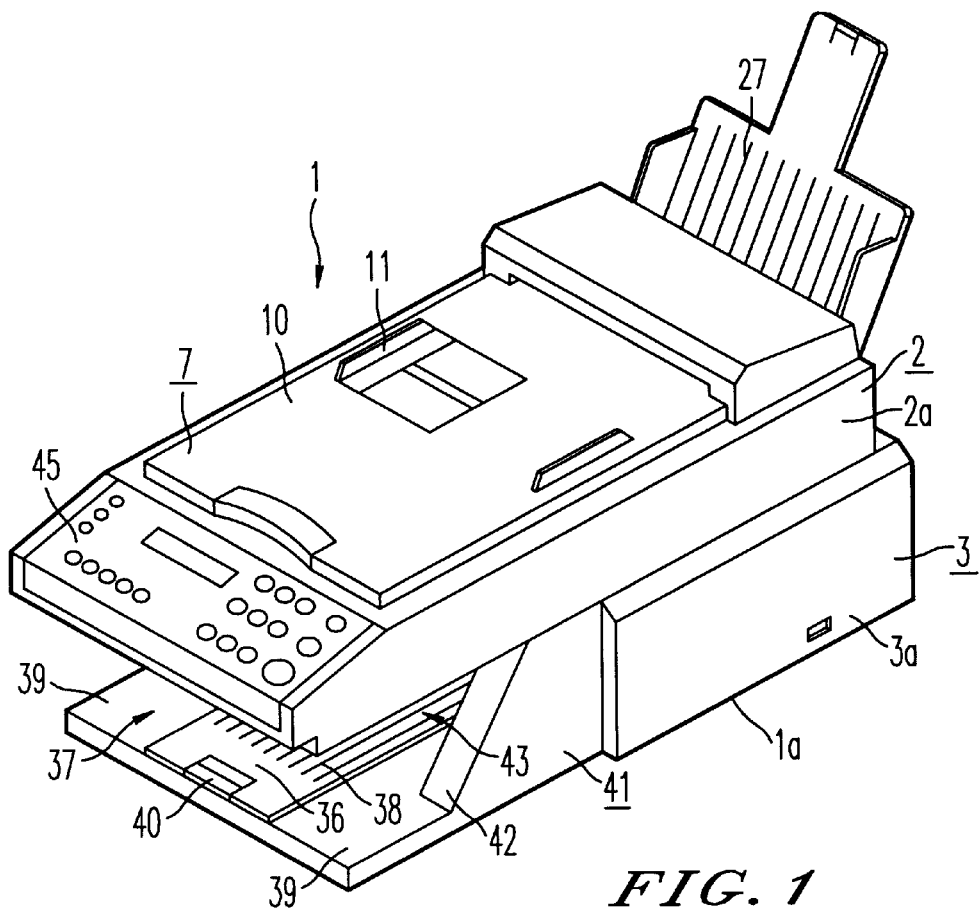
FIG. 1 illustrates an overall view of a facsimile apparatus, which is but one of many exemplary embodiments according to the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 3:
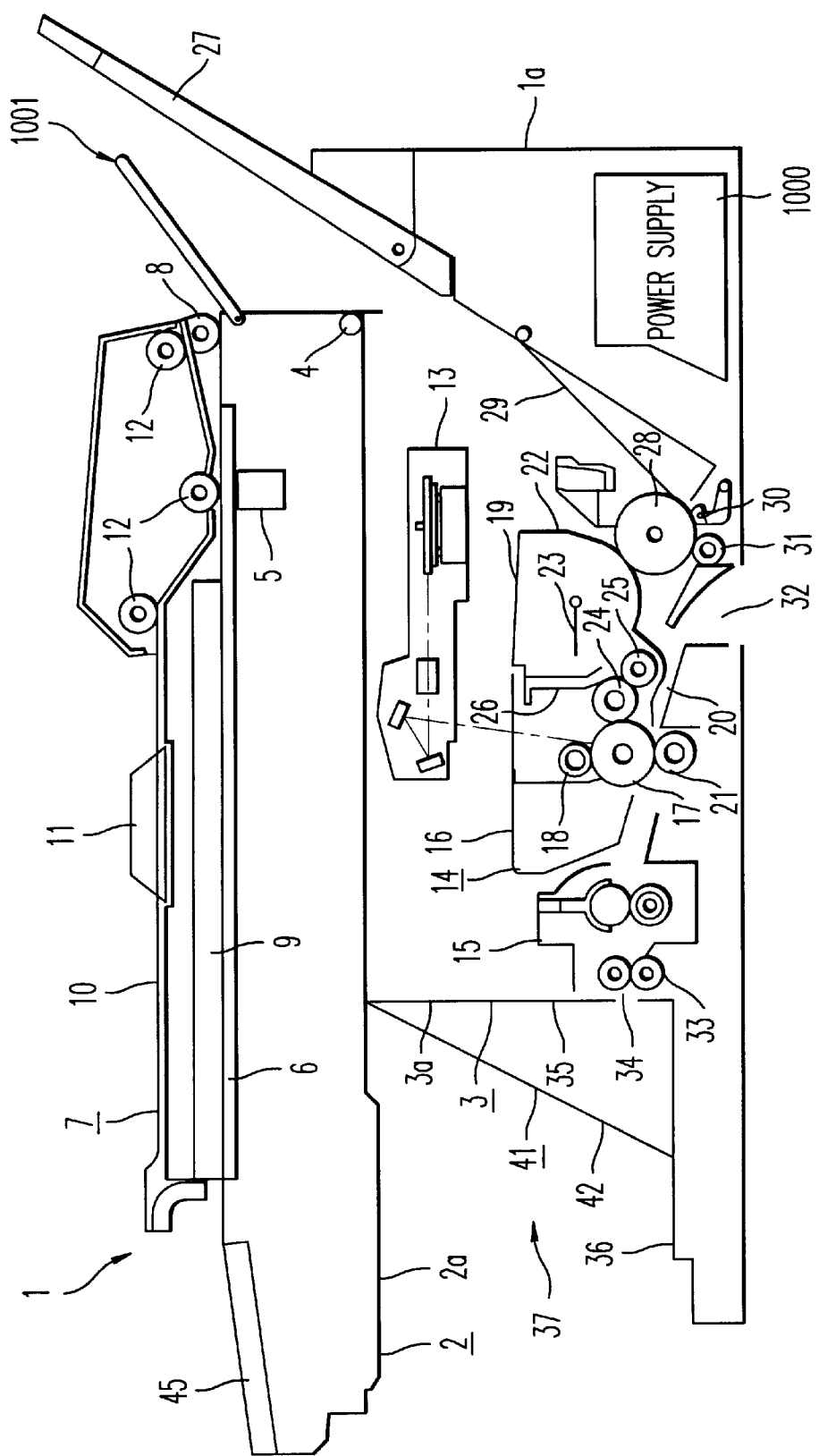
FIG. 3 is a side view of the facsimile apparatus illustrated in FIG. 1.

Referring now to the drawings, wherein like reference numerals designate identical or corresponding parts throughout the several views, and more particularly to FIGS. 1 and 3 thereof, there is illustrated a facsimile apparatus as an exemplary embodiment of the present invention. Other embodiments include copying apparatuses, multifunction devices having a book-mode scanning device, and the like. The image forming apparatus 1 includes an apparatus main body 1a that includes a book-mode scanner 2 with a scanner main body 2a and a printer 3 that includes a printer main body 3a. The apparatus main body 1a includes the scanner main body 2a and the printer main body 3a. The scanner main body 2a is rotatably mounted on the printer main body 3a with a rotational pivot 4 mounted at the rear of the printer main body 3a. With the scanner main body 2a rotated by lifting upwards, an upper side of the printer main body 3a can be opened and accessed. A front top of the scanner main body 2a extends over a front upper surface of the printer main body 3a, so as to form an overhanging projection portion.

The scanner 2 performs an image scanning operation according to either one of a sheet stationary scanning method (i.e., book scanning mode) and a sheet feeding scanning method. The scanner 2 further includes a scanning unit 5 for scanning images, a contact glass 6 on which an original sheet having an image is placed, a pressure cover plate 7 that provides pressure to an original sheet so that the original sheet is held on the contact glass 6, provided on the upper surface of the scanner main body 2a. The scanning unit 5 is located at an inner rear position of the scanner main body 2a and is slidably supported by a pair of rails (not shown) so as to be able to move back and forth along the pair of rails. An image of an original sheet placed on the contact glass 6 is read by the scanning unit 5 that moves along the pair of rails.

The pressure cover plate 7 is rotatably held at a rear edge thereof by a pivot 8, which is situated at the upper rear portion of the scanner main body 2a. On the bottom surface of the pressure cover plate 7, a pad 9 is provided to make the original sheet in close contact with the contact glass 6. The upper side of the pressure cover plate 7 forms a sheet tray 10 on which original sheets can be placed. The sheet tray 10 has an A4 tray size, for example. On the sheet tray 10, a side fence 11 for guiding side edges of original sheets is provided, as well as a pair of rollers 12 for transporting sheets backward when operating in the sheet scanning mode of operation. As shown in FIG. 3, when operating in the sheet scanning mode of operation, pages are passed by the rollers 12 over the fixed scanning unit 5, and are subsequently ejected and received on an inclined fin 1001.

Figure 4:
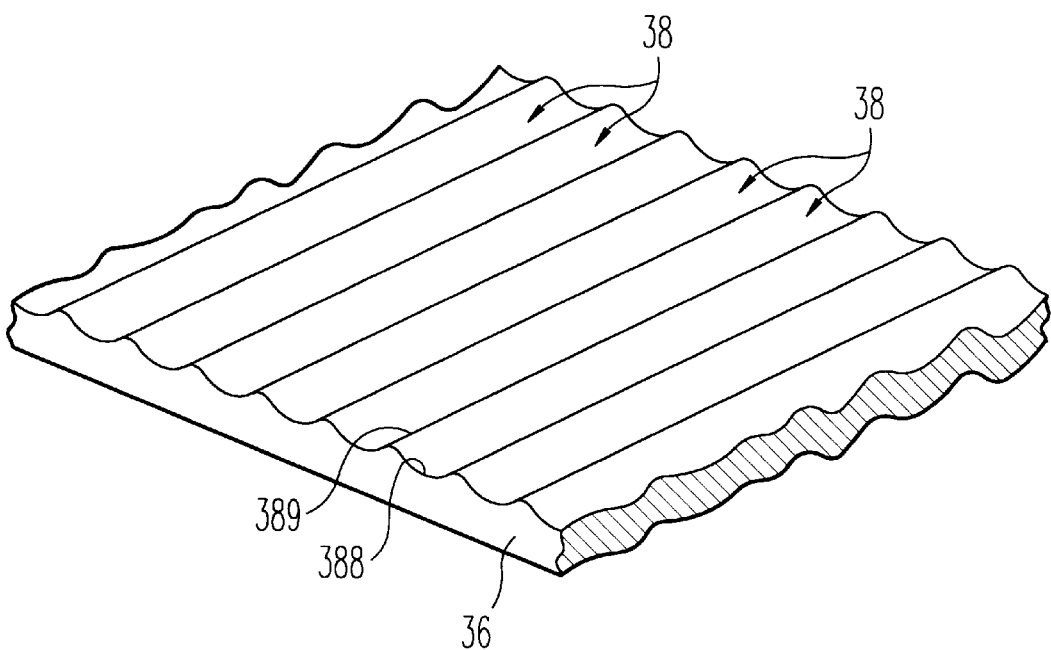
FIG. 4 is a projection view of an image holding member eject tray having a wavy ribbed structure.

As shown in FIG. 4, respective of the ribs 38, are formed in a continuous wavy structure so that sharp boundaries, present in conventional devices, do not exist between a flat horizontal surface and adjacent raised surfaces. The present inventors have identified that this wavy structure helps to minimize the amount of dust that collects on the eject tray 36, thereby helping to provide an acceptable environmental condition, and preserve an attractive aesthetic look of the device. Furthermore, the smooth surfaces are less offensive to touch than ribs with sharp edges, which may cause the operator to break the operator's fingernails. The respective ribs 38 include a trough portion 388 that defines a low point of the respective waves. Each of the troughs 388 have a continuous smooth surface that blends, in a continuous manner, with adjacent crest portions 389. Ejected sheets slide overtop of the crest portions 389.

The printer 3 further includes an electrostatic latent image forming unit 13, a process cartridge 14, and a fixing unit 15. The process cartridge 14 includes a cartridge main body 16, a photoconductor 17, a charging member 18, and a development unit 19. The process cartridge 14 is detachably mounted on a predetermined location inside the printer main body 3a. The photoconductor 17 is rotatably held in the cartridge main body 16 and pressed by a transfer member 21 that is located at an opposite side relative to a sheet passage path 20. The charging member 18 and development unit 19 are positioned around the photoconductor 17. The development unit 19 includes a developing material container 22, an agitator 23, a developing roller 24, a supply roller 25, and a blade 26. The developing material container 22 contains developing material and is molded in one piece with the cartridge main body 16. The agitator 23 is rotatably held inside the developing material container 22 to agitate the developing material contained in the developing material container 22. The supply roller 25 supplies the developing material to the developing roller 24. The blade 26 is in contact with the developing roller 24.

The electrostatic latent image forming unit 13 is mounted on the process cartridge 14 and applies a laser beam that is modulated in accordance with an image signal to a charged surface of the photoconductor 17 so as to form an electrostatic latent image on the surface of the photoconductor 17. The entire apparatus is powered by a power supply unit 1000, as shown in FIG. 3, which converts AC power into various DC power levels used to run the respective components of the apparatus.

To retain recording sheets in a slanted position as well as to hold original sheets after the scanning operation by the scanner 2, a sheet tray 27 is provided toward the rear of the printer main body 3a. Optionally, the fin 1001, when installed, holds the original sheets after being scanned. Below the sheet tray 27, a sheet transfer roller 28, a pressure plate 29, separating pad 30, and a pinch roller 31 are provided. The sheet transfer roller 28 rotates so as to transfer the recording sheet (paper, overhead film and the like). The pressure plate 29 presses the recording sheet on the sheet tray 27 to the sheet transfer roller 28. The separating pad 30 and the pinch roller 31 both elastically press the sheet transfer roller 28 to separate an upper recording sheet from others so as to avoid a so-called double feeding error in which more than one recording sheet are transferred at a time.

The above-mentioned sheet transfer roller 28, separating pad 30, and pinch roller 31 are situated close to the sheet passage path 20. At the bottom of the apparatus main body 1a, a bottom passage 32 is provided between an entrance of the sheet passage path 20 and the sheet transfer roller 28 so as to connect to the sheet passage path 20. The bottom passage 32 passes the recording sheet when a recording sheet is transferred from an additional sheet tray (not shown).

The fixing unit 15 is located downstream of the sheet passage 20, and an eject roller 33 for ejecting the recording sheet is provided downstream of the fixing unit 20. An ejection opening 34 receives the recording sheet from the eject roller 33 in a horizontal direction so that the recording paper is ejected horizontally from the printer section of the apparatus 1. The ejection opening 34 is provided in an ejection-side wall 35, which is at the front of the printer main body 3a and oriented orthogonally to the direction of movement of the ejected paper.

Under the protruding part of the scanner main body 2a and within a projection surface of the apparatus main body 1a, an eject tray 36 is provided for retaining the recording sheets ejected from the ejection opening 34. The eject tray 36 protrudes away from the ejection-side wall 35. Space above the eject tray 36 is referred to as an eject space 37.

The eject tray 36 includes a band of wavy ribs 38 at the center part of the eject tray 36, as shown in FIG. 1 and FIG. 4. The ribs 38 prevent ejected recording sheets from sticking to the eject tray 36 caused by an electrostatic force. As seen in FIG. 4, respective ribs 38 include a trough portion 388 and a crest portion 389. The rib is smoothly shaped, and has no discontinuities. Optionally, the crest portion 389 may be formed as a discontinuous, sharp peak because dust and other particles will not collect at the crest portion 389. On the other hand, smooth crests are less offensive to an operator's hands and will not give rise to problems such as broken fingernails. To the extent dust and other particles collect at the bottom of the trough 388, the dust and other particles are not concentrated along a single line, and thus avoid the problem of developing an observable "dirty line."

Two depression portions 39 are symmetrically formed on the both sides of the eject tray 36, such that the plurality of ribs 38 are positioned therebetween. These two depression portions 39 correspond to the respective side edges of the ejected recording sheet. The two depression portions 39 allow for an operator to easily slip the operator's fingers beneath the ejected recording sheet, so as to grasp the sheets and remove them easily from the apparatus. At the front edge of the eject tray 36, an auxiliary extension tray 40 is provided. The auxiliary extension tray 40 can be pulled out manually to hold long length recording sheets, such as sheets of size A4 and larger in length. Consequently, the image forming apparatus may print on paper, overhead transparencies, and other image holding members that are longer in length than the physical size of the ejection tray 36. Nonetheless, the recording sheets will remain in the ejection space 36, because only a portion of the ejected sheets will extend beyond the auxiliary extension tray 40, whether pulled-out or retracted. Alternatively, only one of the depression portions 39 is provided, or two asymmetrically positioned depression portions 39 are formed.

The scanner main body 2a is mounted on the printer main body 3a while being supported by two support walls 41 that are attached to the side surfaces of the printer main body 3a. Each of the support walls 41 protrudes from a side part of the ejection opening 34 formed on the ejection-side wall 35. The support walls 41 do not support the full length of scanner main body 2a, but are long enough to support the front part of the scanner main body 2a that protrudes from the ejection-side wall 35. Each of the support walls 41 includes an edge surface 42 that is slanted with a top portion being closer to the ejection-side wall 35 than the bottom portion. By having the support walls 41 shorter in length than the scanner main body 2a, the opening 43 for opening the sides of the eject space 37 are formed. The opening 43 is bounded at the rear by the edge surface 42, at the top by a front bottom surface of the scanner main body 2a, at the sides by the support walls 41 and extending to the front of the apparatus, at the bottom by a front upper surface of each of the depression portions 39, and in the front by a line connecting between the front edge of the scanner main body 2a and the front edge of each of the depression portions 39. Alternative if no eject tray is provided, the eject space 37 is bounded at the bottom by a support structure on which the apparatus is placed, and in the front by a line extending vertically from the front of the scanner main body 2a to the support structure. The front may also be said to be bounded by the footprint of the scanner 2 or a predetermined region to the front of the scanner 2.

Figure 2:
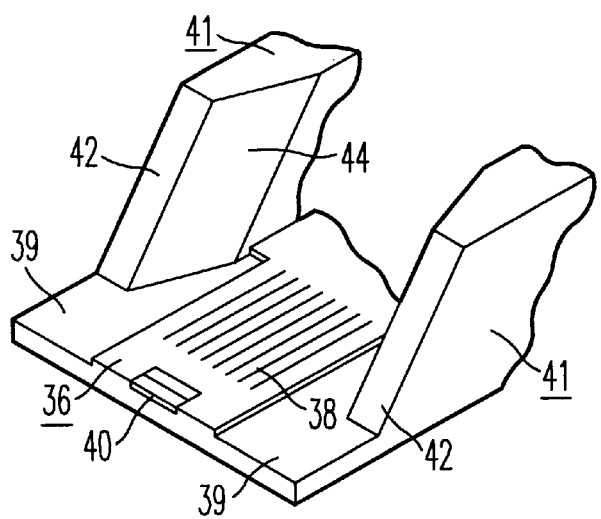
FIG. 2 illustrates a portion of the facsimile apparatus of FIG. 1, and in particular the internal space for handling a printed sheet.

The support walls 41 each have a tapered surface 44 at an inside front portion so that an opening formed by the support walls 41 extends away from the printer portion, as shown in FIG. 2. While the support walls 41 are shown to be solid continuous material, as an alternative, holes or other orifices may be included in the support walls 43, so as to enhance an operator's ability to view whether ejected sheets are present in the ejection tray 36. As a further alternative, the support walls 41 may be formed of a transparent material that also allows an operator to easily view whether ejected pages are present in the ejection tray 36.

At a position in the upper surface of the scanner main body 2a and before the pressure cover plate 7, an operation and display unit 45 is provided. The operation and display unit 45 serves as a user interface for the apparatus 1. The apparatus may optionally include a network interface, such as a RS-232, printer port, FireWire, USB (universal serial bus) or other interface that enables an external device to control the apparatus 1.

In the above-described structure, an image on an original sheet is read by either one of a sheet stationary scanning method or a sheet feeding scanning method. In the sheet stationary scanning method (or book-scanning method), the scanning unit 5 is scanned beneath the original sheet and illuminates the original sheet from beneath the contact glass 6. On the other hand, in the sheet feeding scanning method, the scanning unit 5 remains at a fixed position and an original sheet moves over the scanning unit 5, as fed by the rollers 12.

In the sheet feeding scanning method, a stack of original sheets placed on the sheet tray 10 by a user are transferred to the rear of the apparatus, sheet by sheet, by the set of rollers 12. During the sheet transferring operation, the original sheet is read by the scanning unit 5 which is stationed at the rear side of the scanner main body 2a. After the respective original sheets are passed by the scanning unit 5, the sheets are ejected from the apparatus, and stacked on the fin 1001.

When a sheet to be read is in a book form, or, when a sheet to be read cannot be accommodated by the set of rollers 12, the sheet stationary scanning method is used. In the sheet stationary scanning method, the pressure cover plate 7 is lifted upwards by a user so as to access the contact glass 6. Then, an original sheet is placed on the contact glass 6 and the pressure cover plate 7 is returned to its closed position. Then, the pad 9 of the pressure cover plate 7 presses the original sheet to the contact glass 6 and the original sheet is read by the scanning unit 5 that moves for a scanning operation.

After completion of the scanning operation, an image printing operation is performed. During the image printing operation, the photoconductor 17 rotates clockwise, as shown in FIG. 3, the surface thereof is charged by the charging member 18, and then the electrostatic latent image forming unit 13 forms an image on the photoconductor 17 in accordance with the image read from the original sheet. The latent image formed on the photoconductor 17 is developed by the development unit 19. The developed image is transferred to a recording sheet which is sent from the sheet tray 27 with the sheet transfer roller 28. The image transferred recording sheet is fixed when passed through the fixing unit 15 and then ejected through the ejection opening 34. The ejected recording sheet is then received on the eject tray 36.

In this way, an original sheet is read in either one of a sheet stationary method or a sheet feeding method and, after completion of a reading operation, the read image is printed on a recording sheet which is then ejected and received on the eject tray 36, at an internal space of the apparatus 1. Subsequently, the operator may visually inspect the internal space of the eject tray 36, by simply viewing the eject tray 36 from a side or front portion of the apparatus 1. When the operator sees recorded sheets on the eject tray 36, the operator may conveniently retrieve the recording sheets by reaching into the open space, placing the operator's fingers between the recessed area 39 and the ejected pages, grasping the pages and retrieving them from the open space.

The manner of how recording sheets are contained on the eject tray 36 can be seen not only from the front side of the apparatus main body 1*a* but also from the front tapering direction and from side directions, owing to the opening 43 formed in front of the support walls 41. Furthermore, the tapered surface 44 enables a relatively wider view of how the recording sheets are contained on the eject tray 36.

Recording sheets contained on the eject tray 36 can easily be removed through the wide-opening by the operator inserting a hand into a space between the bottom sheet and depression portion 39 and grasping the recording sheets.

In addition, the eject tray 36 may not necessarily be formed. The present embodiment includes the eject tray 36, so that the apparatus main body 1*a* has a bottom area large enough to prevent the apparatus main body 1*a* from falling down with its own weight. In this case, the support walls 41 formed with a relatively short length are sufficient to support the scanner main body 2*a*.

When the apparatus main body 1*a* includes no eject tray 36, the apparatus main body 1*a* has a relatively smaller bottom area and, therefore, each of the support walls 41 needs to extended to some extent. As a combination, thickening the bottom portion of the support walls 41 makes for a better support of the scanner main body 2*a* as well as the apparatus main body 1*a*, while preserving a wide-open view of the eject space 37.

Obviously, numerous additional modifications and variations of the present invention are possible in light of the above teachings. It is therefore to be understood that within the scope of the appended claims, the present invention may be practiced otherwise than as specifically described herein.

The present document has as a priority document Japanese patent application No. JP 09-113757 filed in the Japanese Patent Office on May 1, 1997, the entire contents of which is incorporated herein by reference.

What is claimed as new and is desired to be secured by Letters Patent of the United States is:

1. An image forming apparatus, comprising:
   a printer configured to produce and eject a printed sheet;
   a scanner having a contact plate configured to receive thereon an original document to be scanned, a footprint area of said scanner being greater than that of said printer; and
   a support structure configured to mount said scanner overtop of said printer such that at least a portion of said scanner overhangs the printer, said support structure including,
      a pair of support walls disposed on opposite sides of said printer and oriented parallel to a direction that the printed sheet is ejected from said printer, respective of said pair of support walls having a shorter length than said scanner such that a projection portion of said scanner being unsupported by either said printer or said support structure,
      a sheet ejection side wall disposed between said pair of scanner support walls and having an opening through which said printed sheet is ejected from said printer, said opening being oriented such that said printed sheet being ejected underneath of said projection portion of said scanner, wherein
   said pair of support walls, said sheet ejection side wall, and a volume under said projection portion of said scanner providing an ejection space that receives the printed sheet ejected from said printer, at least a portion of said ejection space being open and unobstructed such that said printed sheet may be retrieved by an operator.

2. The image forming apparatus of claim 1, wherein:
   each of said support walls having,
      a scanner contact side that is shorter in length than a base side that is opposite to said scanner contact side, and
      an angled front edge side positioned between said base side and said scanner contact side.

3. The image forming apparatus according to claim 1, wherein:
   each of said support walls having a tapered cross section portion with back portion and a front portion, a width between said support walls being wider between respective of said front portions of said support walls than the back portion of said support walls, such that said ejection space is wider toward said front portion than said back portion.

4. The image forming apparatus according to claim 2, wherein:
   each of said support walls having a tapered cross section with a back portion and a front portion, said front portion being closer to said angled front edge than said back portion, a width between said support walls being wider between respective of the front portion of each of said support walls than the back portion of each of said support walls, such that said ejection space is wider toward said front portion than said back portion.

5. The image forming apparatus according to claim 1, further comprising:
   a sheet ejection tray being positioned as a bottom portion of said ejection space and being configured to receive said printed sheet ejected from said printer, said sheet ejection tray having an upper surface that permits said printed sheet to slide there across when ejected from said printer, wherein
   said upper surface having a depression portion formed under said projection portion and along an outer side edge.

6. The image forming apparatus of claim 5, further comprising:
   another depression portion formed in the upper surface of said sheet ejection tray and along another outer side edge.

7. The image forming apparatus of claim 1, further comprising:
   a sheet ejection tray being positioned as a bottom portion of said ejection space and being configured to receive said printed sheet ejected from said printer, said sheet ejection tray having an upper surface that permits said printed sheet to slide there across when ejected from said printer, wherein
   said upper surface having a plurality of ribs having a trough portion between crest portions and having a continuous smooth surface.

8. The image forming apparatus of claim 5, wherein:
   said upper surface having a plurality of ribs, said ribs having a trough portion between crest portions and having a continuous smooth surface.

9. The image forming apparatus according to claim 2, further comprising:
   a sheet ejection tray being positioned as a bottom portion of said ejection space and being configured to receive said printed sheet ejected from said printer, said sheet ejection tray having an upper surface that permits said printed sheet to slide there across when ejected from said printer, wherein
   said upper surface having a depression portion formed under said projection portion and along an outer side edge.

10. The image forming apparatus of claim 9, further comprising:
    another depression portion formed in the upper surface of said sheet ejection tray and along another outer side edge.

11. The image forming apparatus of claim 9, wherein:
    said upper surface having a plurality of ribs, said ribs having a trough portion between crest portions and having a continuous smooth surface.

12. The image forming apparatus according to claim 3, further comprising:
    a sheet ejection tray being positioned as a bottom portion of said ejection space and being configured to receive said printed sheet ejected from said printer, said sheet ejection tray having an upper surface that permits said printed sheet to slide there across when ejected from said printer, wherein
    said upper surface having a depression portion formed under said projection portion and along an outer side edge.

13. The image forming apparatus of claim 12, further comprising:
    another depression portion formed in the upper surface of said sheet ejection tray and along another outer side edge.

14. The image forming apparatus of claim 13, wherein:
    said upper surface having a plurality of ribs, said ribs having a trough portion between crest portions and having a continuous smooth surface.

15. The image forming apparatus according to claim 4, further comprising:
    a sheet ejection tray being positioned as a bottom portion of said ejection space and being configured to receive said printed sheet ejected from said printer, said sheet ejection tray having an upper surface that permits said printed sheet to slide there across when ejected from said printer, wherein
    said upper surface having a depression portion formed under said projection portion and along an outer side edge.

16. The image forming apparatus of claim 15, further comprising:
    another depression portion formed in the upper surface of said sheet ejection tray and along another outer side edge.

17. The image forming apparatus of claim 16, wherein:
    said upper surface having a plurality of ribs, said ribs having a trough portion between crest portions and having a continuous smooth surface.

18. The image forming apparatus according to claim 1, further comprising:
    an automatic document feeder configured to feed the original document over a scanning unit and pass the original document to an ejection port.

19. The image forming apparatus according to claim 1, wherein said contact plate comprises a contact glass platen oriented in a horizontal direction, and accessible to an operator from a top of said apparatus.

20. The apparatus according to claim 1, wherein the printed sheet is ejected to the ejection space, said ejection space being an internal space that does not increase a footprint of said apparatus as would be necessary with an external receiving tray.

21. An image forming apparatus, comprising:
    a book-scanning unit having a predetermined footprint size, including,
       a horizontally oriented contact glass on which an original book-document is placed during a book-scanning operation,
       a scanning element positioned beneath said contact glass and configured to move across said contact glass platen during said book-scanning operation,
       a user-interface panel positioned adjacent to said contact glass and at a front portion of said book-scanning unit, said user-interface including a keypad through which an operator enters operational commands, and a display that presents visual messages to the operator,
       an axial hinge disposed at a lower rear portion of said book-scanning unit, said book-scanning unit being configured to rotate about said hinge and allow the operator access to a space beneath that which is covered by the book-scanning unit during the book-scanning operation, and
       a cover removably disposed over said contact glass and configured to hold said original book document against said contact glass during a book-scanning operation;
    a printer having a smaller footprint than said footprint of said book-scanning unit, said printer being disposed beneath said book-scanning unit, including
       a printing section configured to print an image on a recording sheet, and
       a recording sheet path through which the recording sheet is passed to said printing section and subsequently ejected to an ejection space, said recording sheet path having an input through which the recording sheet passes during a printing operation, said input being coupled to a developing section that applies an image forming medium to said recording sheet so as to form a developed image corresponding to an image on said original book document, said recording sheet path having an output section through which the recording sheet is ejected;
    a power supply configured to receive alternating current and convert said alternating current into direct current power for said apparatus; and
    a support structure having,
       a base section,
       a rear wall connected to said base section and extending vertically therefrom,
       a pair of support walls, connected to said base section on a bottom portion thereof and to said rear wall at respective back portions thereof, said pair of support walls extending vertically, said book-scanning unit supported on top of said pair of support walls and overtop of said printer, respective of said support walls, having a longitudinal direction, that extends from said rear wall to under the front portion of said book-scanning unit, said recording sheet path configured to eject said recording sheet away from said rear wall and toward said output section, an ejection-side wall positioned between respective of said pair of support walls, and in front of said output of said printing section, said ejection-side wall having an opening formed there through which said recording sheet is ejected, a top portion of said ejection-side wall contacting a bottom portion of said scanner unit, a projection portion of said book-scanner unit being suspended without support in front of said ejection-side wall and said support walls, respective of said support walls, having slanted edges between said book-scanner unit and said base section, said slanted edges being closer to said rear wall at a top portion thereof than at a bottom portion thereof, respective of said support walls having a tapered facet that tapers from said slanted edges toward the other support wall such that a distance between respective support walls being narrower at said sheet ejection side wall than at the slanted edges, said projection portion of said book-scanning unit defining an upper portion of an interior space into which the printed sheet is received, said interior space having an open and unobstructed side portion, said side portion being in front of respective of said slanted edges and underneath said projection portion, said open and unobstructed side portion being of sufficient area to enable visual inspection of the interior space and retrieval of the printed sheet from the interior space.

22. The image forming apparatus of claim 21, wherein:
said base section including a sheet ejection tray having an upper surface formed with a plurality of ribs thereon, respective of said ribs having a trough portion between crest portions and having a continuous smooth surface.

23. An image forming apparatus, comprising:

means for scanning an original book-document with an original image and producing an output signal, said original book-document being stationary when scanned by said means for scanning;

means for printing a printed image on a recording sheet, including means for converting said output signal into a printing signal, means for producing said printed image on said recording sheet with an image forming means, and means for ejecting said recording sheet;

means for stably supporting at a fixed position said means for scanning over said means for printing and an interior space that is disposed under at least a portion of said means for scanning, means for receiving said recording sheet after being ejected by said means for ejecting, including means for receiving at least one half of said recording sheet in the interior space of said apparatus, said interior space being, bounded at a top, a bottom, and a rear side thereof, open on a front side, and partially bounded, but not completely bounded, on opposing sides between said front side and said rear side; and means for providing visible and physical access to said recording sheet contained in said interior space.

* * * * *